Patented July 12, 1949

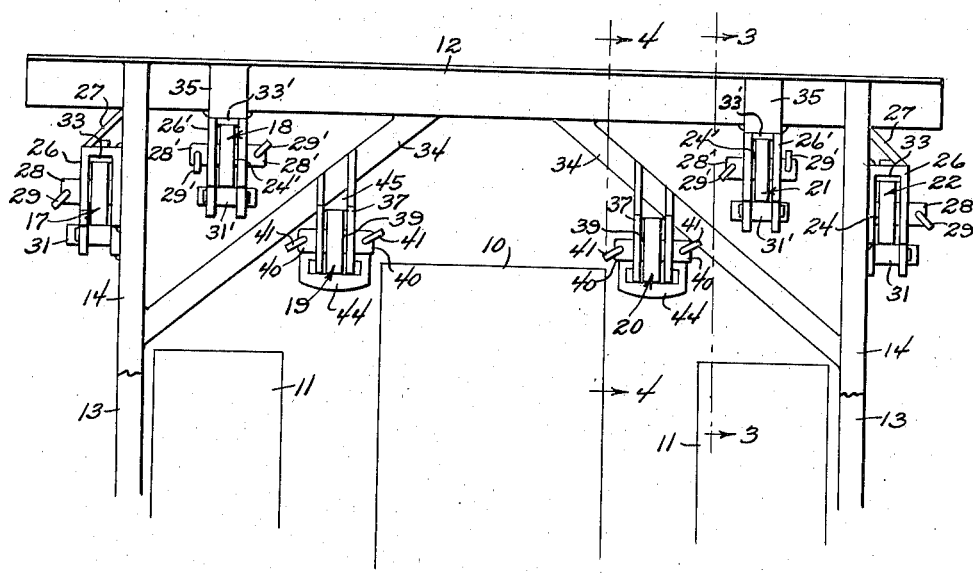

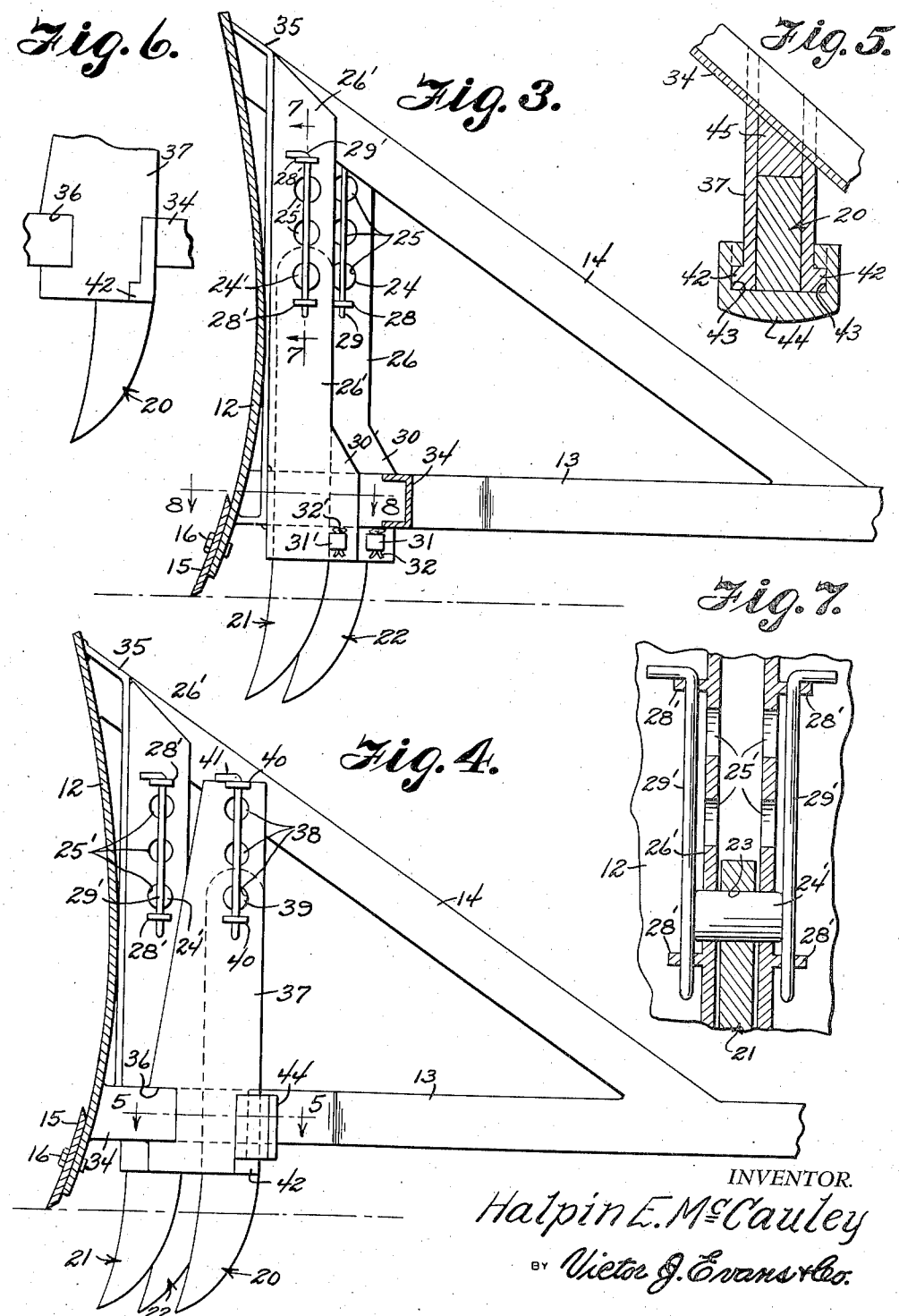

2,475,710

UNITED STATES PATENT OFFICE 2,475,710

COMBINATION BULLDOZER AND RIPPER

Halpin E. McCauley, Cliff, N. Mex.

Application March 20, 1947, Serial No. 736,036

1 Claim. (Cl. 37—145)

This invention relates to improvements in earth moving or working machines generally, and more particularly to a bulldozer having ripper teeth associated with the blade thereof.

One of the several objects of the invention is to provide a machine of this kind, provided with a plurality of ripping spikes which are effective during the forward or rearward movement of the machine.

Another object of the invention is to mount the ripping spikes in close proximity to the blade, to operate within an area forward of the ground gripping trails of the machine, and to form means for adjusting the spikes, to provide a deep cut or a shallow cut.

Another object of the invention is to provide mounting means for the spikes that will compensate for the wear on the spikes during either the forward or backward movement of the machine.

With the above and other objects and advantages in view, the invention resides in the novel features of construction, arrangement and combination of parts more fully hereinafter described, claimed, and illustrated in the accompanying drawings in which:

Figure 1 is a top plan view showing spacing of the ripping spikes along the blade and the supports therefor;

Figure 2 is an end elevation of the blade and its supporting structure, showing the manner of mounting the spikes thereon;

Figure 3 is a vertical sectional view on the line 3—3 of Figure 1;

Figure 4 is a vertical sectional view on the line 4—4 of Figure 1;

Figure 5 is a sectional view on the line 5—5 of Figure 4;

Figure 6 is a fragmentary view of a blade mounted as shown in section in Figure 5;

Figure 7 is a sectional view on the line 7—7 of Figure 3 and

Figure 8 is a sectional view on the line 8—8 of Figure 3.

Referring more in detail to the drawings, the reference characters 10 and 11 respectively indicate the power plant and ground gripping tracks of a tractor as conventionally used for operating a bulldozer blade 12 which is carried at the outer ends of angled metal frame members 13, that project forwardly from opposite sides of the tractor. The tip portion of the blade 12 is given strengthened support from the frame members 13 by diagonal brace members 14 and the lower longitudinal edge of the blade has a longitudinally extending cutting blade 15 secured thereto by fasteners 16.

The tractor designated by the numerals 10 and 11 constitutes no part of the present invention, except that it furnishes the motor power for the bulldozing operations, and will influence the position of the spikes during the forward and backward movements of the bulldozer.

The embodiment of the invention hereinafter to be described includes the ripping spikes 17, 18, 19, 20, 21 and 22 respectively, which are of similar construction.

The spikes 17 and 22 are each provided with an aperture 23 adjacent the upper end thereof to receive a pin 24 which is receivable in the spaced apertures 25 of the U-shaped bracket 26 which is secured as by welding at the end thereof to the outer side of the brace 14, and at the lower end thereof to the outer side of the member 13, and diagonal brace 27 secured as by welding to the brace 14 and bracket 26 further strengthens the bracket.

On the outer side of the bracket 26, there are secured thereto, above and below the topmost and bottommost openings 25, the outstanding apertured lugs 28 which are adapted to receive the elongated pin 29, whereby the pin 24 is retained in the bracket 26. The sides of the U-shaped bracket 26 are provided with opposed rearwardly extending wings 30 which carry the lock pin 31 which is retained in place by the cotter-key 32 against which the spikes 17 and 22 strike during the forward ripping motion of the bulldozer. A wear plate 33 is provided within the bracket 26 for engaging the spike when the bulldozer is ripping in reverse.

Secured by welding to the rear of the blade 12, intermediate of the brace 14, and diagonal braces 34 which are secured by welding to the blade 12 and portion 13 are the supporting members 35, which carry brackets 26', being similar in structure to brackets 26 except that the lugs 28' are formed on both sides of the bracket to carry the pins 29' for the retention of the pins 24' for pivoting of spikes 18 and 21 as shown in Figure 7, and pins 31' carry cotter pins 32' in each end thereof.

Secured to the braces 34, by means of cutouts 36 therein, are the U-shaped brackets 37 having the spaced openings 38 therein to receive a pin 39 for the pivotal mounting of the spikes 19 and 20. The lugs 40 are provided to receive the pin 41 for the retention of the pin 39, as described, for the previous brackets. However, instead of wings thereon, the brackets are provided with L-shaped projections 42, which are engaged in the keeper slots 43 in the lock member 44, which is slid over the members 42 to stop at the base of said member. The member 44 serves as a lock for forward movement of the bulldozer, and the wear plate 45 engages the spikes in reverse movement. This form of bracket is used when the type of bracket shown at 26 and 26' is too wide at the wing portion thereof.

In Figure 2, it is shown in dotted lines that the cutting points of the spikes can be reversed for ripping in the opposite direction, also the pins 31 can be removed to permit dragging of the spikes, if the ripping action is not desired.

The ripping action is obtainable in either backward or forward movements of the bulldozer or in only one direction as desired.

It is believed that from the foregoing description, the structure and operation of the invention will be apparent to those skilled in the art, and it is to be understood that changes in the minor details of construction may be resorted to, provided they fall within the spirit of the invention and the scope of the appended claim.

Having thus described the invention, what is claimed as new and desired to be secured by Letters Patent is:

In a combination bulldozer and ripper having a frame provided with a ground engaging blade at the forward end thereof, a pair of diagonal braces each connected at one end to the frame and at the other end to the blade, the improvement comprising U-shaped brackets secured to the outside surfaces of the frame, to the blade intermediate of the braces and the frame and to the rear surfaces of the braces, each of said brackets having a row of relatively spaced openings therein longitudinally thereof, outstanding apertured ears at the top and bottom of each row, a pin adapted to be selectively received in the openings in said brackets, ripping spikes having an opening in the upper end thereof by which said spikes are pivotally mounted on said pins, a locking bolt adapted to be positioned in said apertured ears to engage the outer ends of the pins to retain said pins in position, opposed rearwardly extending wings on said brackets, rear pins carried by said wings adapted to engage the rear edges of said spikes, and a wear plate carried by said bracket to engage the front edge of said spikes and said spikes are adapted to be reversed so that they could have ground gripping engagement with the ground upon forward or backward movement of the blade.

HALPIN E. McCAULEY.

REFERENCES CITED

The following references are of record in the file of this patent:

UNITED STATES PATENTS

| Number | Name | Date |
| --- | --- | --- |
| 2,081,192 | Allin et al. | May 25, 1937 |
| 2,265,395 | Rau | Dec. 9, 1941 |
| 2,276,586 | McIntosh | Mar. 17, 1942 |
| 2,279,869 | Houston | Apr. 14, 1942 |
| 2,396,739 | McCauley | Mar. 19, 1946 |